US008284405B1

(12) United States Patent
Clark

(10) Patent No.: US 8,284,405 B1
(45) Date of Patent: Oct. 9, 2012

(54) REMOTE PASSIVE SENSING OF A VIBRATION SIGNATURE USING MODULATED LIGHT

(75) Inventor: Frank O. Clark, Dunstable, MA (US)

(73) Assignee: The United States of America as Represented by The Secretary of the Air Force, Washington, DC (US)

( * ) Notice: Subject to any disclaimer, the term of this patent is extended or adjusted under 35 U.S.C. 154(b) by 383 days.

(21) Appl. No.: 12/636,456

(22) Filed: Dec. 11, 2009

Related U.S. Application Data

(60) Provisional application No. 61/122,702, filed on Dec. 15, 2008.

(51) Int. Cl.
*G01N 21/55* (2006.01)
(52) U.S. Cl. .......................................... 356/447
(58) Field of Classification Search ................ None
See application file for complete search history.

(56) References Cited

U.S. PATENT DOCUMENTS 4,738,138 A * 4/1988 Redman-White ............... 73/594
2008/0229907 A1 * 9/2008 Clark .............................. 84/454

* cited by examiner

*Primary Examiner* — Tu Nguyen
(74) *Attorney, Agent, or Firm* — James M. Skorich

(57) ABSTRACT

An optical detector senses the intensity of scattered light reflected by a surface coupled to a vibration source. If the vibration source is operating, the coupled surface vibrates at the same frequency. Incident light reflected by the surface is modulated by the vibration at a hypertemporal frequency. The detector produces a direct electrical current as a temporal function of the detected modulated light intensity. A transimpedance amplifier converts the current into a voltage. A voltage amplifier amplifies the voltage. An analog-to-digital converter converts the amplified voltage into digital signal. A digital signal processor converts the digital signal into a function of power spectral density and frequency using Fourier transform and principle component analyses. The vibration signature of the vibration source, if present, is discerned from a graphical display of the foregoing function.

3 Claims, 4 Drawing Sheets

REMOTE PASSIVE SENSING OF A VIBRATION SIGNATURE USING MODULATED LIGHT

CROSS-REFERENCE TO RELATED APPLICATION

This application claims the benefit of U.S. Provisional Application No. 61/122,702, filed Dec. 15, 2008.

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

FIELD OF THE INVENTION

The present invention is related to passively detecting a vibration signature by sensing and measuring modulated light diffusely scattered from the surface of a remote object coupled with local vibration of that object. More specifically, the invention analyzes light modulated by a remote surface coupled with either a mechanical or acoustical vibration source, without being in contact with that surface, and distinguishes between the presence of a desired vibration signature and vibration caused by background sources.

BACKGROUND OF THE INVENTION

Typical methods of measuring vibration require placing a device such as a seismometer or microphone with a transmitter, at a location of interest; measuring modulation from solar glints, i.e., when the angle subtended by incident sunlight and a surface normal is equal to the angle subtended by the normal and the reflected light; or using an active detector that either emits light or microwave radiation, and subsequently analyzing the reflected light or radiation. Each of the foregoing methods has an inherent shortcoming which compromises its utility.

More particularly, attaching a device to a location of interest requires physical access in addition to providing a means of extracting information from the site, e.g., also attaching a radio frequency transmitter with a battery that will require replacement, or recovering in situ recording media. Given the celestial movement of the sun, the modulation of solar glints can be measured only briefly when the sun, object of interest, and observer possess a preferred orientation, typically once a day. Active devices reveal both the act of measuring and the location of the observer. Common to all of the foregoing methodologies are inaccuracies introduced by background vibrations.

There is a need in the art for means to measure vibration at a site for which it is difficult or impossible to obtain physical access. It is also desirable to be able to obtain a vibration measurement at different times during the day, on an overcast day, or even using moonlight. Furthermore, situations may call for concealing that a measurement is being taken. Concomitant with all of the foregoing shortcomings is the need to obtain an accurate vibration measurement in the presence of background vibration coupling with the object for which a vibration measurement is sought. The present invention fulfills the aforementioned needs in the art.

SUMMARY OF THE INVENTION

Briefly, the present invention detects minute changes in light intensity, commonly referred to as modulation, for light that is diffusely scattered from a surface that is coupled with a vibration. The invention measures the hypertemporal frequency of the modulation, i.e., a frequency greater than that which can be sensed by the human eye. Diffusely scattered light may be observed from any coupled surface, with no required orientation of the surface relative to the light source or a device sensing the reflected light. The invention operates at varying light levels, e.g., moonlight or sunlight. The lower the inertial mass of the light-scattering surface, the higher the modulation frequency that can be recovered. For example, a two-foot by two-foot sheet of 2 mm steel permits recovery of the entire audible frequency rage, i.e., up to 20,000 Hz.

Materials such as window glass or sheer window curtains provide very high frequency modulation, while lower frequency information may be recovered from virtually anything, including concrete foundations. Because the invention operates passively using modulated light originally emanating from any available light source, it may obtain vibration information emanating from inside a room and coupling with a pane of window glass, a structural wall, or earthen ground. An object of the invention is to discern the signature of a vibration emanating from an unseen source by distinguishing it from background noise, and thereby identify the source.

An optical detector having a large dynamic range detects the frequency components of diffusely scattered light, and converts the detected signals into a small electrical current. A transimpedance amplifier converts the small current into a small voltage. A voltage amplifier increases the small voltage into a larger signal which then is input to a large dynamic range analog-to-digital converter which digitizes the signal. The respective dynamic ranges of the foregoing components are matched so that the dynamic range of the apparatus is not limited by any one component. A computer subsequently processes the digital signal using a Fourier transform to generate the power spectral density of the modulated light as function of its frequency.

The aforementioned function may contain both the vibration caused by a source whose presence is desired to be ascertained, and by background vibration caused by ambient sources, e.g., automobiles. If the vibration source is present, the Fourier transform extracts the signature of the vibration source from the clutter of the background vibration. The invention will function at any light wavelength, i.e., from ultraviolet (0.2 µm) to thermal infrared (10 µm), for which there is diffusely scattered light or thermal emission emanating from the surface of interest.

Other aspects and advantages of the present invention will become apparent from the following detailed description, taken in conjunction with the accompanying drawings, and illustrating by way of example the principles of the invention.

DETAILED DESCRIPTION

The optical information that may be gathered by the human eye is limited by the slow physiological response of the eye and mind. Visual processing of a time varying stimulus takes approximately 150 milliseconds. Consequently, periodic changes in an optical field more frequent than seven times per second will not be recognized. For example, one cannot see the 60 Hz flicker of fluorescent lighting, the rotating blades of a turbine, the turbulence of a rocket exhaust, or the fluctuations in glints of sunlight from leaves, because they all occur too rapidly for the human eye and mind to process and recognize Optical information that occurs too rapidly for human recognition is commonly referred to as a hypertemporal image.

The present invention senses the hypertemporal images created by modulated light being diffusely reflected from a surface coupled to a source of vibration. The frequency of modulation is contained in the hypertemporal images. The present invention separates the ambient noise by Fourier transform, to reveal either the presence of a vibration source by recognizing its frequency signature, or the absence of the vibration source if its vibration signature is not detected.

Figure 1:
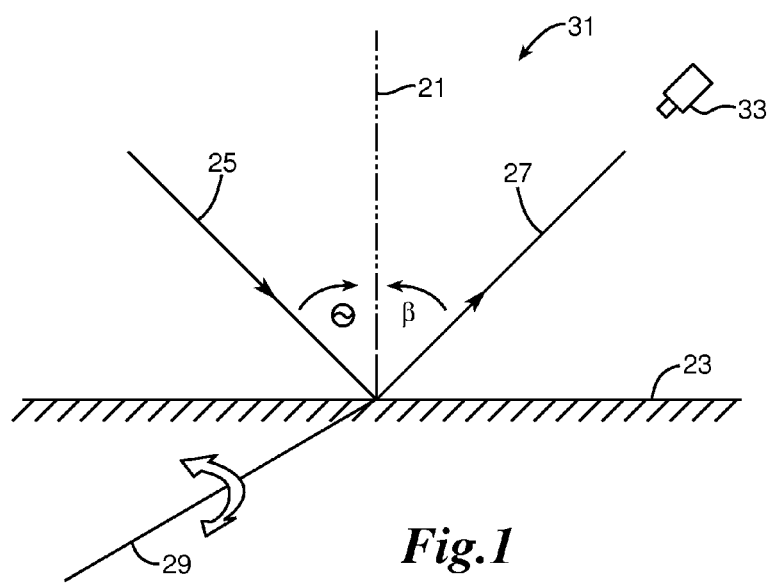
FIG. 1 is a schematic drawing illustrating how to measure the vibration of a surface using specular reflected light.

Referring to FIG. 1, normal 21 is perpendicular to surface 23. θ is the angle subtended by normal 21 and incident light ray 25. β is the angle subtended by normal 21 and reflected light ray 27. When θ=β, light ray 27 is specular; when θ≠β, light ray 27 is non-specular, or scattered. Normal 21, and light rays 25 and 27 are coplanar. Axis 29 is an axis of rotation for surface 23, lying normal to the plane containing normal 21 and light rays 25 and 27. Apparatus 31 includes light detector 33, which also lies in the plane containing normal 21 and light rays 25 and 27, and is aligned to detect light ray 27 reflected at angle β.

If surface 23 rotates cyclically, both clockwise and counterclockwise about axis 29, then the period and frequency of the rotation cycle can be determined by the frequency at which specular light ray 27 is detected by light detector 33. If incident light 25 emanates from the sun, then the frequency of the cyclic rocking of surface 23 can be measured only for one brief period every day, i.e., when the sun lies at angle θ, and, furthermore, if the sun is not obscured by clouds. The utility of apparatus 31 is thus limited.

Figure 2:
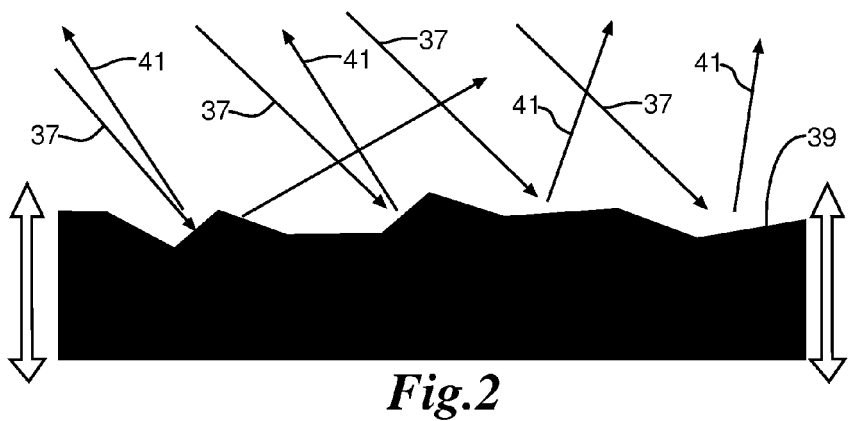
FIG. 2 is schematic drawing showing light scattered by an object having an irregular surface.

FIG. 2 shows incident light rays 37 being diffusely scattered by irregular surface 39. The irregularities in surface 39 could be, for example, dirt particles on a pane of glass. Light rays 41 comprise diffusely scattered light. As illustrated, modulation of diffusely scattered light is caused by vibration or motion of surface 39.

Figure 3:
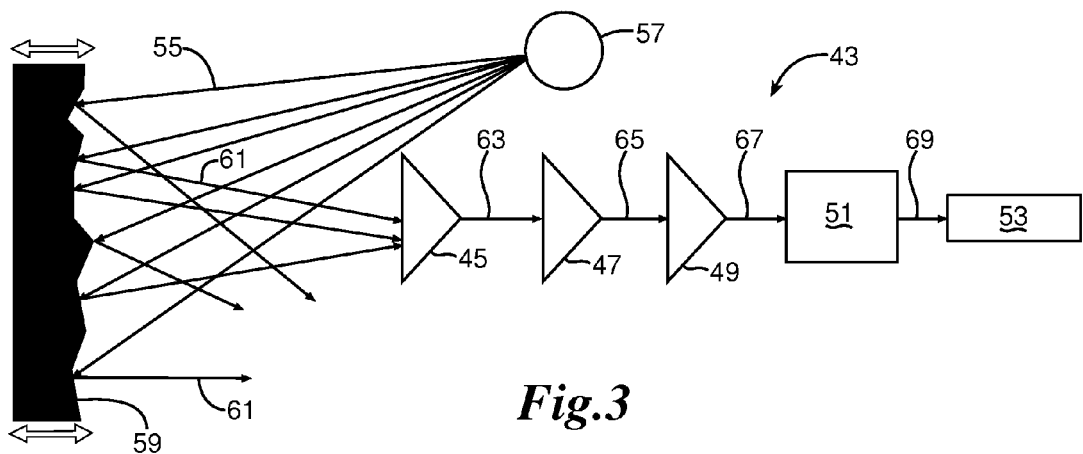
FIG. 3 is a schematic drawing of the present invention shown sensing light emanating from a light source and being modulated by a vibrating surface.

FIG. 3 is a schematic drawing of vibration sensing apparatus 43, an embodiment of the present invention. As shown therein, apparatus 43 is comprised of components having a large dynamic range, including optical detector 45, transimpedence amplifier 47, voltage amplifier 49, analog-to-digital converter 51 and digital processor 53. Light rays 55 emanate from light source 57, which, for example, may be the sun, the moon, or an anthropic source.

Light rays 55 are incident upon irregular surface 59, which vibrates due to ambient sources, e.g., automobile traffic, and, possibly, a singular source of vibration, the presence of which is sought to be ascertained. Some of diffusely reflected light rays 61 are sensed by detector 45. The frequency of reflected light rays 61 is modulated by the vibration of surface 59. That is, detector 45 senses the frequency of the vibration of surface 59 by discerning the frequency at which the intensity of detected light rays 61 varies. This modulation is hypertemporal and thus cannot be sensed by the human eye.

Detector 45 is comprised of a focal plane array of optical detectors. Any detector material known to one skilled in the art could be used in detector 45; for example, Indium Gallium Arsenide or silicon. Detector 45 generates direct electrical current 63 as a function of the intensity of sensed light rays 61. As the intensity of detected light rays 61 is modulated by the vibration of surface 59, the magnitude of electrical current 63 will concomitantly vary as a function of the modulation of the intensity of detected light rays 61. Current 63 is directly coupled to transimpedence amplifier 47, which converts current 63 into voltage 65.

Voltage 65 is electrically communicated to amplifier 49, which amplifies voltage 65 to voltage 67. Voltage 67 is amplified to a voltage level compatible with analog-to-digital converter 51. Voltage 67 is electrically communicated to analog-to-digital converter 51, which converts voltage 67 into digital signal 69. Analog-to-digital converter 51 is at least 20 bits and has a dynamic range of at least 1,000,000. Detector 45, transimpedence amplifier 47 and amplifier 49 each has a minimum dynamic range of a least 100,000. Alternatively stated, detector 45 has at least a 20-bit dynamic range accuracy.

Digital signal 69 is electrically communicated to digital processor 53, which uses Fourier transform techniques well known to mathematicians to perform time domain analysis and convert digital signal 69 into a function of power spectral density and frequency. Alternatively, other techniques or algorithms, many of which are known to those skilled in the relevant art, may be used to perform the foregoing analysis and conversion of digital signal 69. The conversion of digital signal 69 into a function of power spectral density and frequency is provided as an example; digital signal 69 may be converted into any time domain function using the techniques or algorithms hereinbefore referenced. Digital processor 53 also uses principle component analysis, a standard image processing technique well known to those skilled in the optical arts, to remove motion of detector 45.

A graphical display of the time domain function generated by digital processor 53 typically reveals the presence of a vibration signature by virtue of a peak or spike in a power spectral density at a particular frequency. Recognition of a vibration signature may otherwise require comparing a graphical display generated when it is known or presumed that the source of vibration whose presence it is sought to determine is not operating or present, with graphical displays generated at other times when the foregoing source of vibration may be operating or present. There will be a peak or spike at a particular frequency in the latter that is absent in the former. In this manner, the graphical display generated by digital processor 53 allows the signature, if present, to be discerned from the clutter generated by ambient noise, which also causes surface 59 to vibrate and modulate rays 61 sensed by detector 45.

The use of direct current in conjunction with principle component analysis permits removal of line of sight effects and detector motion artifacts, as the artifacts simply become an artifact Eigen-image. Detection using alternating current will not permit motion removal and would therefore restrict use of the present invention to an absolutely stationary light detector, i.e., one free from vibration caused by ambient sources.

Figure 4A:
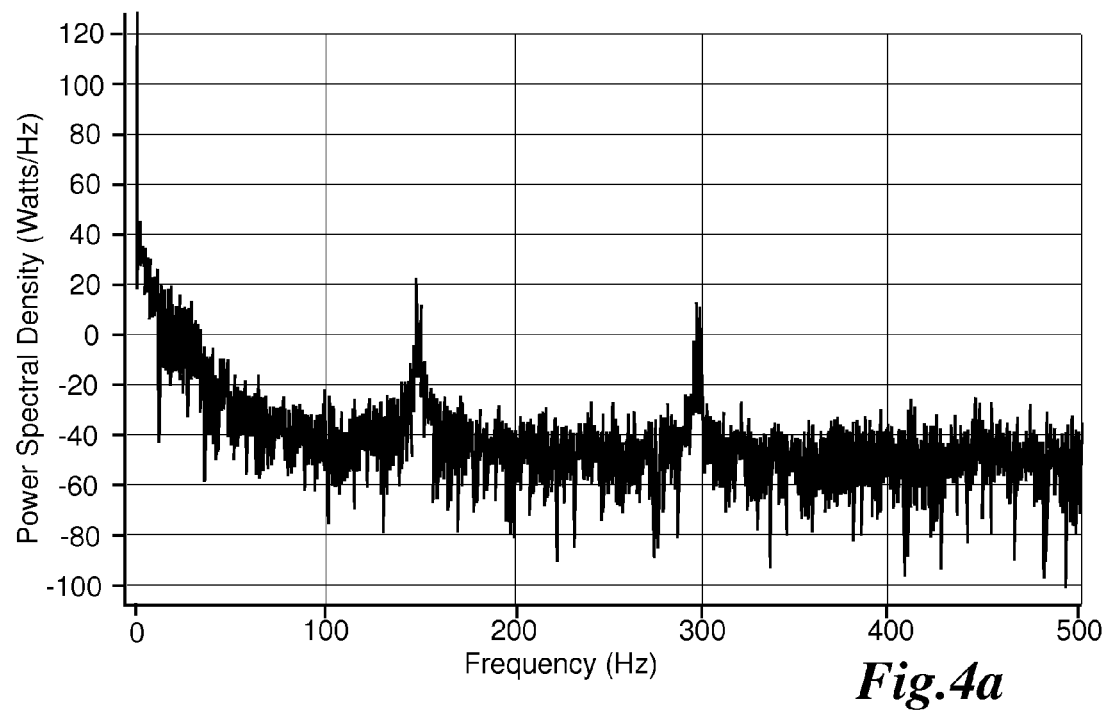
FIGS. 4a and 4b are graphs of power spectral density as a function of frequency, comparing the present invention vis-à-vis a commercial seismometer for detecting light modulated by vibration of a tree.
Figure 4B:
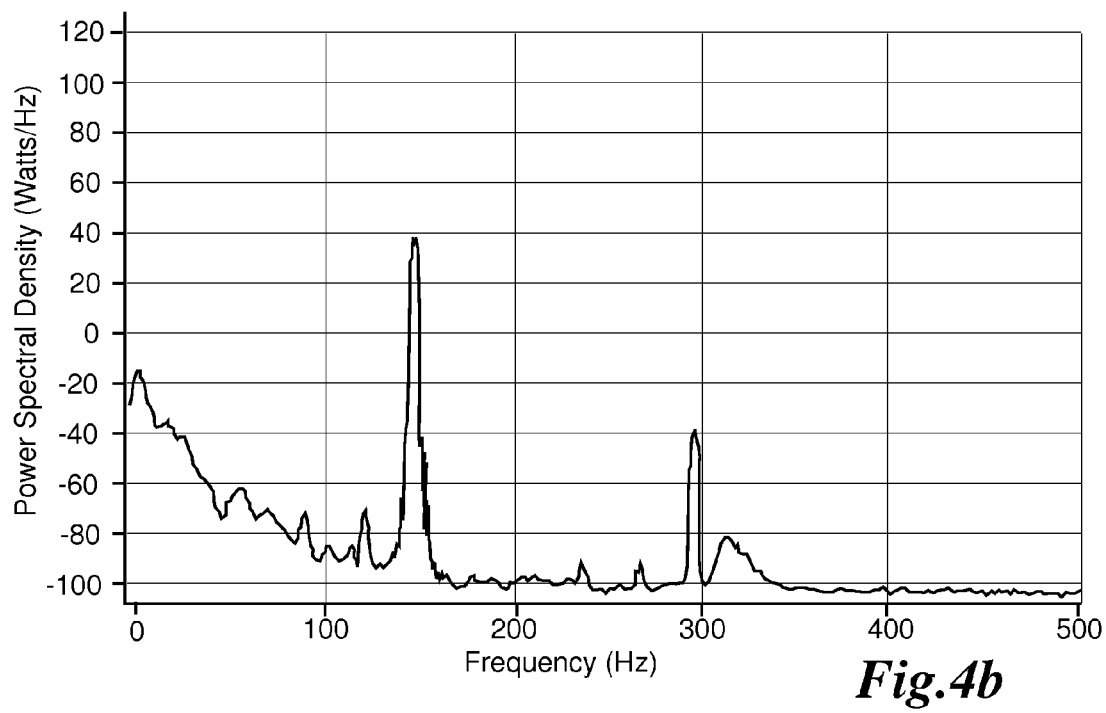

In an experiment, known acoustic frequencies were emitted by a loudspeaker positioned adjacent to a tree. FIG. 4a is a graph of the power spectral density (shown on the ordinate) as a function of frequency (shown on the abscissa) for sunlight diffusely scattered by the tree and detected by optical detector 45 of apparatus 43. FIG. 4b is a graph showing the vibration sensed by a commercially available seismometer attached to the tree.

FIG. 4a shows that apparatus 43 detected diffusely scattered light modulated at a frequency of 150 Hz with a first overtone at 300 Hz. The accuracy of the vibration signature detected by apparatus 43 is confirmed by the same signature being detected by the seismometer.

Figure 5:
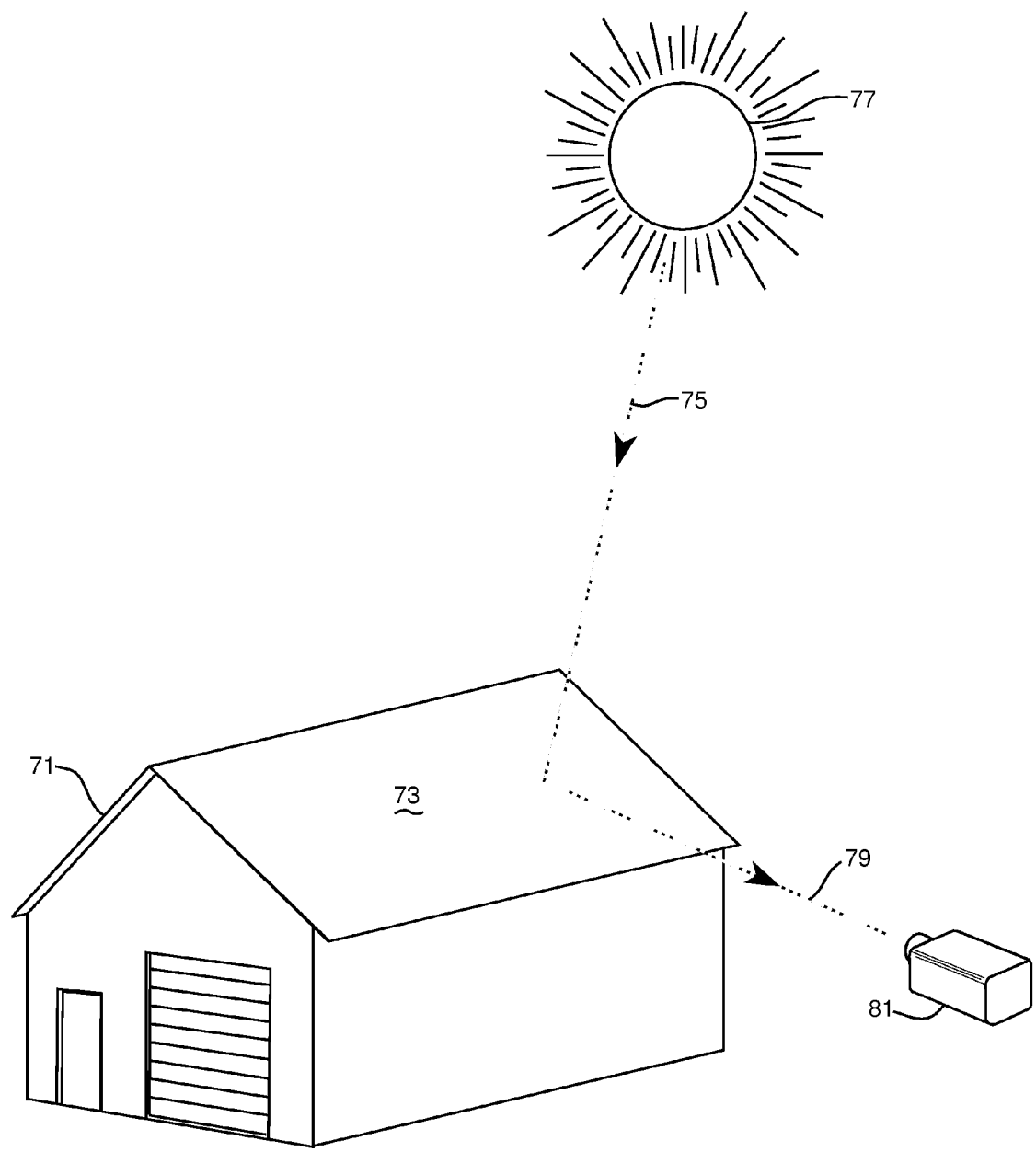
FIG. 5 illustrates an example of how the present invention could be used to remotely and passively detect a vibration signature generated by a machine concealed in a warehouse.

FIG. 5 illustrates an example of how the present invention could be used to passively detect a vibration signature generated by a machine concealed in a warehouse, and thus ascertain the presence of the machine therein. If the machine operates cyclically at a known number of revolutions per minute, it will vibrate at a known frequency. If the machine is operating inside warehouse 71, warehouse roof 73 will couple with the vibration of the machine and vibrate at the same frequency. Light rays 75 emanating from sun 77 are incident upon roof 73. Roof 73 diffusely scatters incident light rays 75 to form reflected light rays 79.

Optical detector 81 is an element of an embodiment of the present invention, the remainder of which is not shown, but is comprised of elements disclosed and cooperating as discussed with respect to apparatus 43. Optical detector 81 detects some of light rays 79 and generates a direct electrical current as a function thereof, which is directly coupled to the remaining elements of the apparatus. As hereinbefore explained in conjunction with apparatus 43, the current generated by optical detector 81 ultimately is converted into a function of power spectral density and frequency.

Figure 6A:
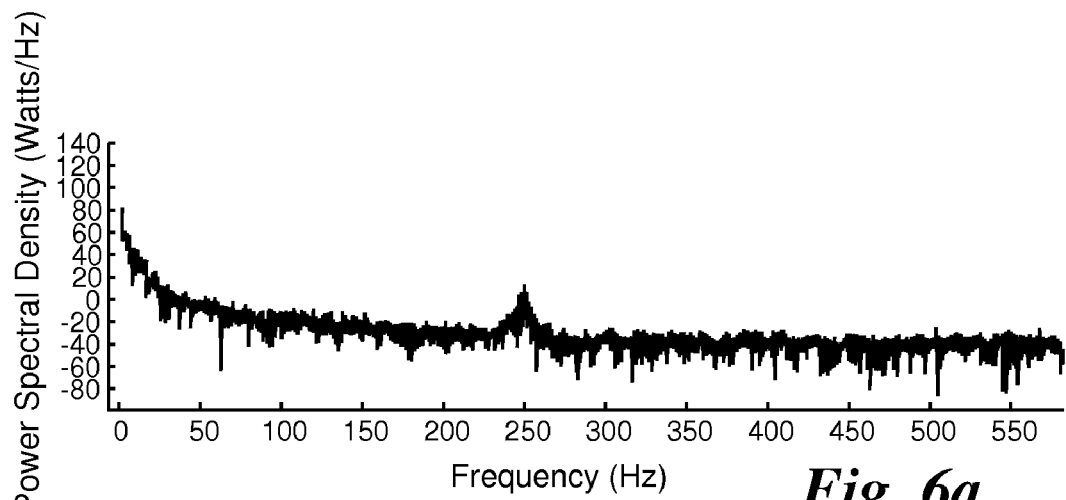
FIGS. 6a and 6b are examples of the graphs that the present invention could be expected to provide to discern the vibration signature in the example of FIG. 5.
Figure 6B:
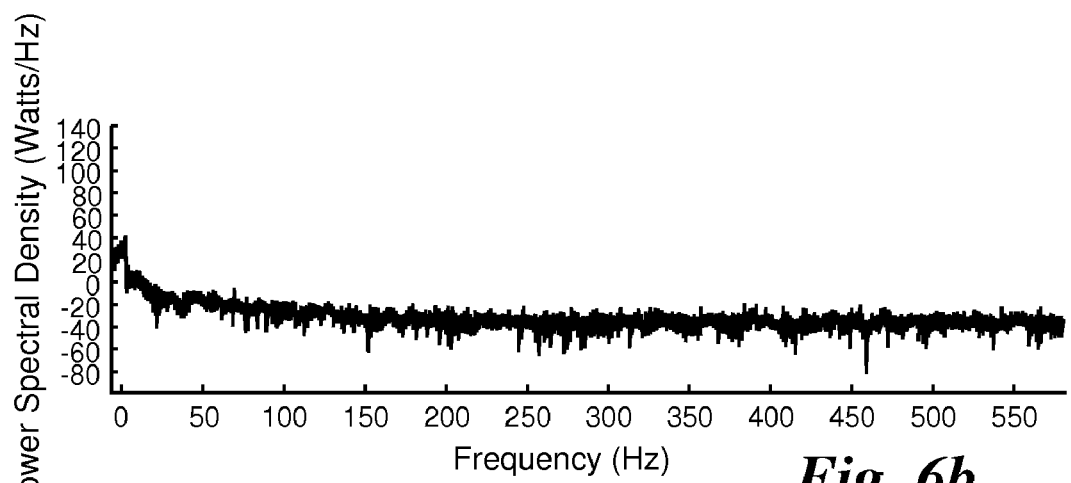

FIGS. 6a and 6b comprise a graphical display of the foregoing time domain function that the present invention could be expected to provide in the aforementioned situation. FIG. 6a shows a spike in the power spectral density at a frequency of 250 Hz, corresponding to the frequency at which the machine operates. This is compared to FIG. 6b, which fails to show such a spike. FIG. 6b would be interpreted as sensing the vibration of roof 73 when the machine inside warehouse 71 is not operating. The spike in FIG. 6a thus provides a vibration signature signaling the presence of the machine inside warehouse 71.

The presence of ambient noise does not affect detection of the desired vibration signature. Also, rather than roof 73, diffused light scattered by a wall or window pane could be used by the present invention to similar effect. The presence of the machine concealed within warehouse 71 could thus be detected remotely, passively, without intrusion, at any time of day, or possibly using moonlight or artificial local lighting, and thus significantly reducing the possibility of alerting anyone inside warehouse 71 that it was under surveillance.

It is to be understood that the preceding is merely a detailed description of an apparatus and method of the present invention, and that numerous changes to the disclosed apparatus and method can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An apparatus using modulated light for sensing vibration of a surface, comprising:
   an optical detector for sensing intensity of light diffusely reflected from a surface and modulated by vibration of the surface, and for generating a direct electrical current that is a temporal function of sensed light intensity;
   the direct electrical current being coupled to a transimpedence amplifier for converting the direct electrical current into a voltage;
   a second amplifier for amplifying the voltage to an amplified voltage;
   an analog-to-digital converter for converting the amplified voltage into a first digital signal and a second digital signal;
   the first digital signal being generated by sensing intensity of light modulated by ambient vibration and by a singular vibration source;
   the second digital signal being generated by sensing intensity of light modulated only by ambient vibration;
   a signal processor for converting the first digital signal into a first time domain function and for converting the second digital signal into a second time domain function;
   the first time domain function being displayed as a first graph and the second time domain function being displayed as a second graph; and
   means for comparing the first and second graphs, to discern a vibration signature for the singular vibration source.

2. An apparatus for detecting a vibration signature using modulated light, comprising:
   an optical detector for detecting hypertemporal fluctuation in intensity of modulated light and generating a signal having a signal magnitude that is a temporal function of detected light intensity;
   a transimpedance amplifier for converting the signal into a voltage that is a function of the signal magnitude;
   a voltage amplifier for amplifying the voltage into an amplified voltage;
   an analog-to-digital converter for converting the amplified voltage into a digital signal;
   a signal processor for converting the digital signal into a time domain function;
   the digital signal being comprised of a first digital signal and a second digital signal;
   the first digital signal being generated by detecting hypertemporal fluctuation in intensity of light modulated by ambient vibration and by a singular vibration source;
   the time domain function for the first digital signal being a first time domain function and being displayed as a first graph;
   the second digital signal being generated by detecting hypertemporal fluctuation in intensity of light modulated only by ambient vibration;
   the time domain function for the second digital signal being a second time domain function and being displayed as a second graph; and
   means for comparing the first and second graphs, to discern a vibration signature for the singular vibration source.

3. A method for discerning a vibration signature using modulated light, comprising:
   detecting hypertemporal fluctuation in intensity of modulated light and generating a first signal as a function of light intensity modulated by ambient vibration and a singular vibration source, and generating a second signal as a function of light intensity modulated only by ambient vibration;
   converting the first and second signals into first and second voltages, respectively;
   amplifying the first and second voltages into first and second amplified voltages, respectively;
   converting the first and second amplified voltages into first and second digital signals, respectively;
   converting the first and second digital signals into first and second time domain functions, respectively:
   displaying the first and second time domain functions as first and second graphs, respectively; and
   discerning a vibration signature for the singular vibration source by comparing the first and second graphs.

* * * * *